(12) United States Patent
Suzuki et al.

(10) Patent No.: US 10,414,307 B2
(45) Date of Patent: Sep. 17, 2019

(54) BACK FRAME OF VEHICLE SEAT

(71) Applicant: TOYOTA BOSHOKU KABUSHIKI KAISHA, Aichi-ken (JP)

(72) Inventors: Hiroyuki Suzuki, Aichi-ken (JP); Hiroshi Mizobata, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/980,856

(22) Filed: May 16, 2018

(65) Prior Publication Data
US 2018/0334065 A1 Nov. 22, 2018

(30) Foreign Application Priority Data

May 18, 2017 (JP) ................... 2017-098849

(51) Int. Cl.
*B60N 2/42* (2006.01)
*B60N 2/68* (2006.01)

(52) U.S. Cl.
CPC ............... *B60N 2/682* (2013.01); *B60N 2/68* (2013.01); *B60N 2/688* (2013.01)

(58) Field of Classification Search
CPC ................................ B60N 2/682; B60N 2/688
USPC .............................. 297/216.13, 452.18, 452.2
See application file for complete search history.

(56) References Cited

U.S. PATENT DOCUMENTS

| 6,241,318 | B1 * | 6/2001 | Amano | B60N 2/682 297/452.2 |
| 6,554,356 | B1 * | 4/2003 | Crose | B60N 2/242 297/216.13 |
| 6,767,067 | B2 * | 7/2004 | Fourrey | B29C 70/44 297/452.2 X |
| 7,887,139 | B2 * | 2/2011 | Yamada | B60N 2/22 297/452.2 X |
| 8,132,862 | B2 * | 3/2012 | Yamada | B60N 2/688 297/216.13 |
| 8,459,747 | B2 * | 6/2013 | Watanabe | B60N 2/22 297/452.2 X |
| 8,523,284 | B2 * | 9/2013 | Yamada | B60N 2/22 297/216.13 |
| 8,827,362 | B2 * | 9/2014 | Yamaki | B60N 2/4235 297/216.13 |
| 8,870,293 | B2 * | 10/2014 | Seibold | B60N 2/68 297/452.2 X |

(Continued)

FOREIGN PATENT DOCUMENTS

JP 2014-156212 8/2014

*Primary Examiner* — Rodney B White

(74) *Attorney, Agent, or Firm* — Greenblum & Bernstein, P.L.C.

(57) ABSTRACT

A back frame of a vehicle seat including: a pair of side frames; an upper frame; and a reinforcing member attached to at least one of the pair of side frames, wherein the at least one of the pair of side frames has a pair of side surface portions and a rear surface portion, wherein the reinforcing member has a pair of side wall portions and a rear wall portion, wherein the rear wall portion is thicker than the pair of side wall portions, and wherein in a state where the reinforcing member is put on the at least one of the pair of side frames, the pair of side wall portions is in contact with and connected to the pair of side surface portions, and the rear wall portion is in contact with and connected to the rear surface portion by bonding or adhesion.

5 Claims, 13 Drawing Sheets

(56) References Cited

U.S. PATENT DOCUMENTS

| | | | | |
|---|---|---|---|---|
| 8,888,176 B2* | 11/2014 | Kaku | ............... | B60N 2/4235 |
| | | | | 297/216.13 |
| 8,888,177 B2* | 11/2014 | Kaku | ............... | B60N 2/4235 |
| | | | | 297/216.13 |
| 8,888,191 B2* | 11/2014 | Hosokawa | ............... | B60N 2/22 |
| | | | | 297/452.18 |
| 8,967,663 B2* | 3/2015 | Seki | ............... | B60N 2/4228 |
| | | | | 297/216.13 X |
| 8,979,193 B2* | 3/2015 | Nonomiya | ............... | B60N 2/22 |
| | | | | 297/216.13 |
| 9,010,855 B2* | 4/2015 | Yamaki | ............... | B60N 2/0232 |
| | | | | 297/216.13 |
| 9,039,093 B2* | 5/2015 | Nishiura | ............... | B60N 2/68 |
| | | | | 297/216.13 |
| 9,039,094 B2* | 5/2015 | Yamada | ............... | B60N 2/682 |
| | | | | 297/216.13 X |
| 9,102,251 B2* | 8/2015 | Kaku | ............... | B60N 2/4235 |
| 9,102,253 B2* | 8/2015 | Kaku | ............... | B60N 2/4235 |
| 9,108,547 B2* | 8/2015 | Kaku | ............... | B60N 2/4235 |
| 9,108,548 B2* | 8/2015 | Kaku | ............... | B60N 2/4235 |
| 9,227,271 B2* | 1/2016 | Kushiyama | ............... | B23K 9/0043 |
| 9,481,278 B2* | 11/2016 | Mitsuhashi | ............... | B60N 2/68 |
| 9,511,691 B2* | 12/2016 | Komatsubara | ............... | B60N 2/68 |
| 9,545,891 B2* | 1/2017 | Tanabe | ............... | B60N 2/68 |
| 9,573,501 B2* | 2/2017 | Shiromura | ............... | B60N 2/68 |
| 9,868,370 B2* | 1/2018 | Kaneko | ............... | B60N 2/68 |
| 10,144,325 B2* | 12/2018 | Akaike | ............... | B60N 2/682 |
| 10,220,743 B2* | 3/2019 | Mizobata | ............... | B60N 2/682 |
| 2014/0232162 A1 | 8/2014 | Mitsuhashi | | |

* cited by examiner

BACK FRAME OF VEHICLE SEAT

CROSS-REFERENCE TO RELATED APPLICATIONS

This application claims priority from Japanese Patent Application No. 2017-098849 filed on May 18, 2017, the entire contents of which are incorporated herein by reference.

TECHNICAL FIELD

The disclosure relates to a back frame of a vehicle seat to be mounted on a vehicle such as an automobile, an airplane, a ship, a train.

BACKGROUND

As one of a back frame of a vehicle seat, there is a gate-shaped back frame which serves as a framework of a seat back and has a substantially inverted U-shape in a front view and which is formed by connecting upper end portions of a pair of side frames extending in an upper and lower direction in a bridging manner with an upper frame. Such type of a back frame disclosed in JP-A-2014-156212 is used for a vehicle seat with a built-in three-point seatbelt. In the structure of the back frame disclosed in JP-A-2014-156212, an upper end portion of a high-strength side frame on one side to which a load from a webbing of a seatbelt device is directly applied and an upper end portion of a normal-strength side frame on the other side are connected by an upper frame, and a belt guide is attached to the upper end portion of the high-strength side frame. Further, a lower end side of the high-strength side frame and a lower end side of the normal-strength side frame are connected in a bridging manner by a lower pipe. The belt guide is a member for guiding a webbing released from a webbing take-up device disposed inside a seat back so as to extend from a back side toward a front side of the back frame.

In the above structure, the lower pipe connects the lower end side of the high-strength side frame and the lower end side of the normal-strength side frame and functions to suppress the gate-shaped back frame having a substantially inverted U shape in a front view not to fall in a left and right direction. However, the lower pipe does not have a function of enhancing the bending rigidity of the high-strength side frame and/or the normal-strength side frame in a front and rear direction. Thus, it has been difficult to reduce the weight of the back frame by reducing an external line shape of the cross section of the high-strength side frame and/or the normal-strength side frame or reducing thickness of component members of the high-strength side frame and/or the normal-strength side frame. Therefore, a structure capable of enhancing the bending rigidity of the high-strength side frame and/or the normal-strength side frame in the front and rear direction with a simple structure has been required.

SUMMARY

The disclosure aims to provide a back frame of a vehicle seat which has a structure capable of enhancing the bending rigidity in the front and rear direction of left and right side frames with a simple structure.

An aspect of the present disclosure is a back frame of a vehicle seat including: a pair of left and right side frames extending in an upper and lower direction; an upper frame connecting upper end sides of the pair of side frames in a bridging manner; and a reinforcing member attached to a rear side of a lower end side of at least one of the pair of side frames by being put thereon from the outside, wherein the at least one of the pair of side frames has a closed cross section and has a pair of left and right side surface portions and a rear surface portion connecting rear end portions of the pair of left and right side surface portions, and the pair of left and right side surface portions and the rear surface portion are connected in a substantially U-shape opened forward, wherein and the reinforcing member has an opened cross section and has a pair of left and right side wall portions and a rear wall portion connecting rear end portions of the pair of left and right side wall portions, and the pair of left and right side wall portions and the rear wall portion are connected in a substantially U-shape opened forward, wherein the rear wall portion is thicker than the pair of left and right side wall portions, and wherein in a state where the reinforcing member is put on the at least one of the pair of side frames, the pair of left and right side wall portions is in contact with and connected to the pair of left and right side surface portions, and the rear wall portion is in contact with and connected to the rear surface portion by bonding or adhesion.

DETAILED DESCRIPTION

FIGS. 1 to 7 show a first embodiment of the disclosure. This embodiment represents an example in which the disclosure is applied to a back frame of an automobile seat. In each drawing, respective directions of an automobile and an automobile seat in the state where the automobile seat to which a back frame is attached is mounted on a floor of the automobile are indicated by arrows. In the following, the descriptions relating to the directions will be made on the basis of these directions.

Figure 1:
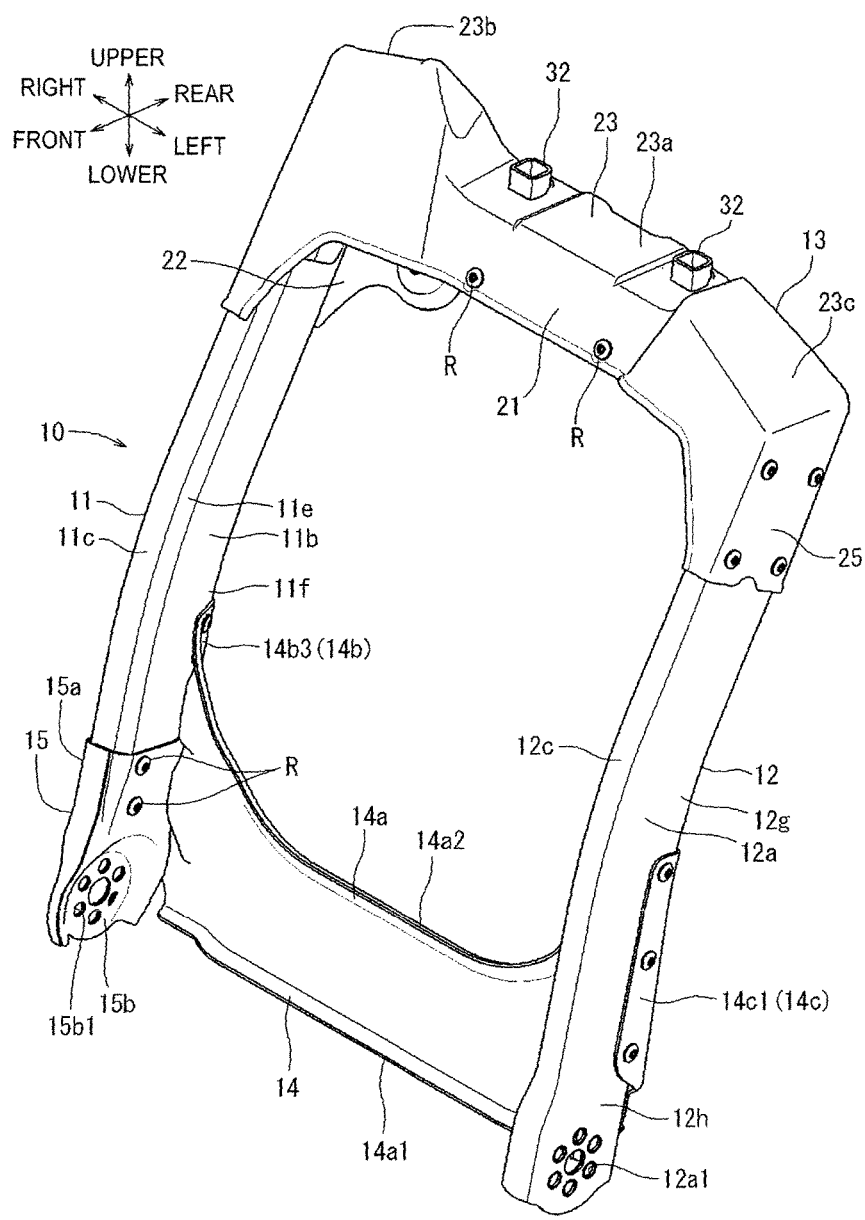
FIG. 1 is a perspective view of a back frame of a right automobile seat according to a first embodiment of the disclosure.
Figure 2:
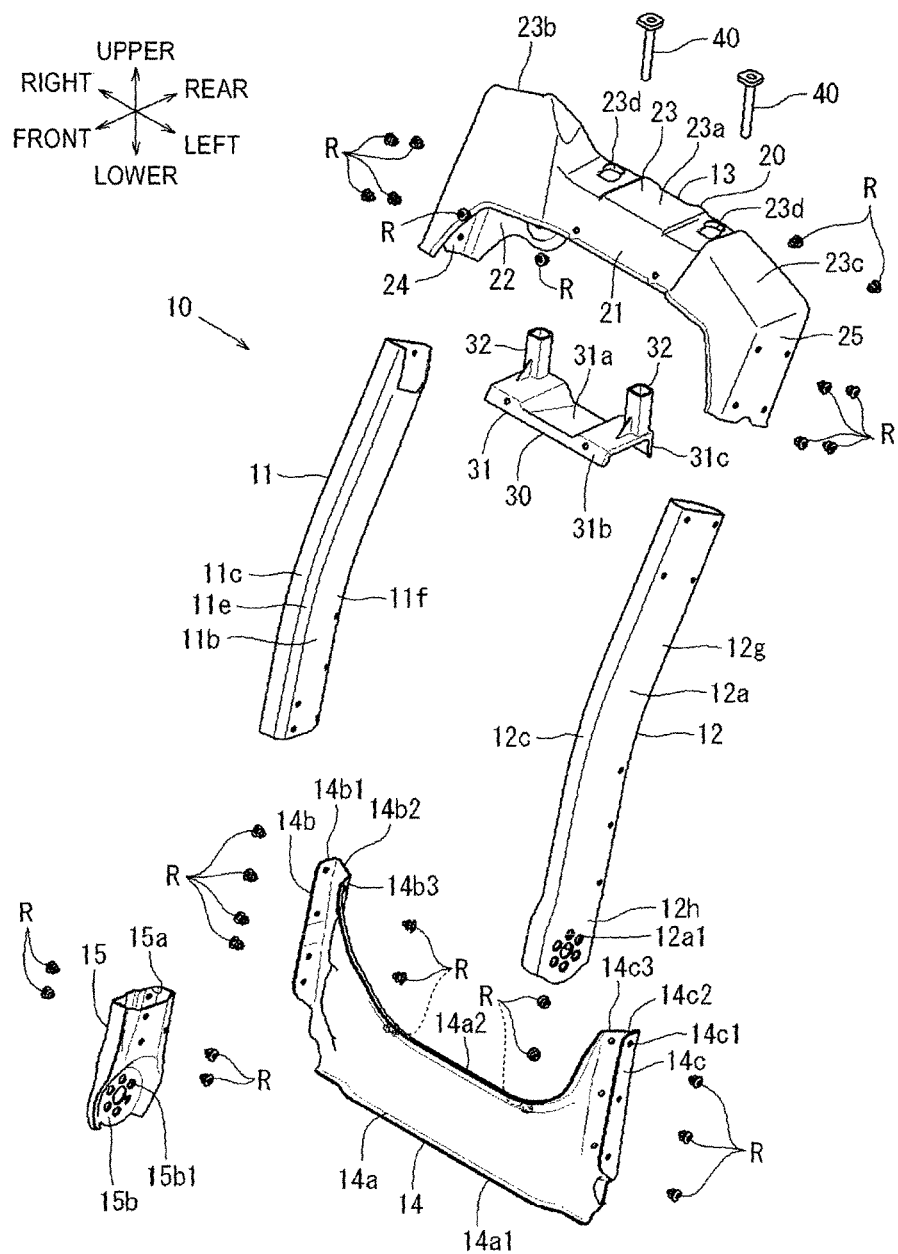
FIG. 2 is an exploded perspective view of the back frame according to the above embodiment.
Figure 3:
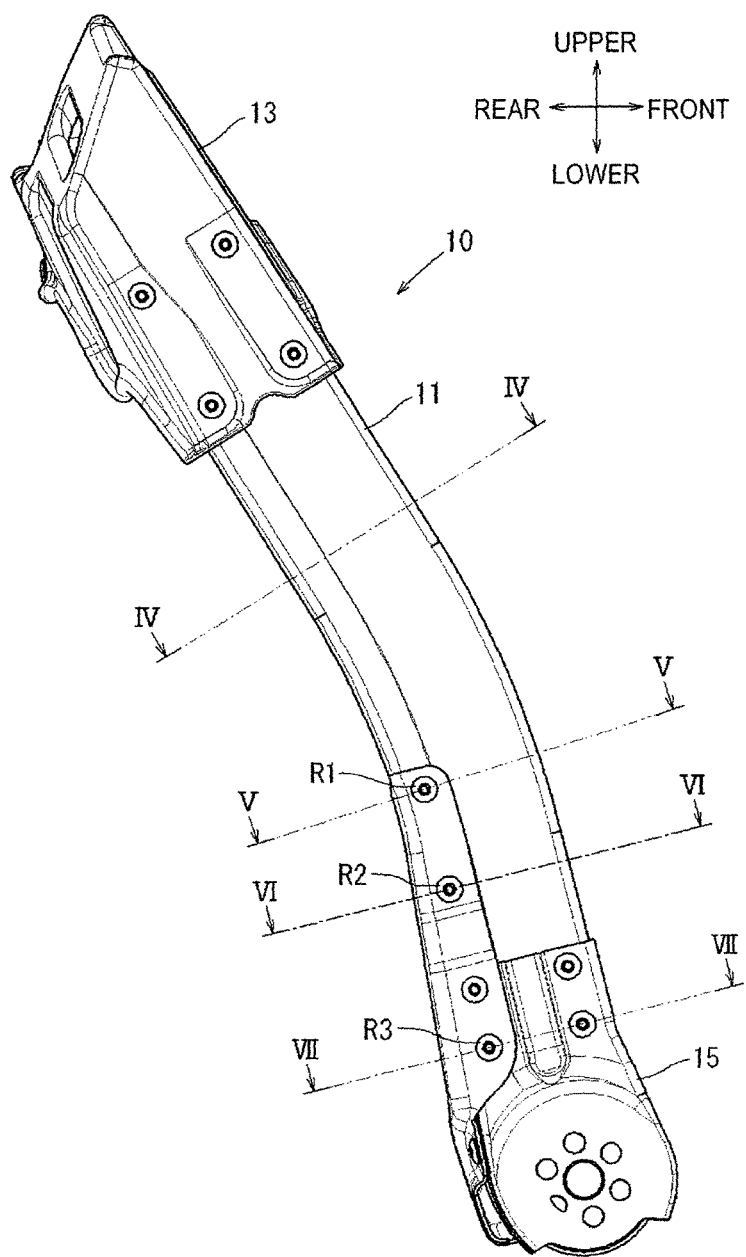
FIG. 3 is a right side view of the back frame according to the above embodiment.

As shown in FIGS. 1 to 3, a back frame 10 of the present embodiment is a back frame of a right automobile seat with a built-in seatbelt. A webbing take-up device (not shown) of a seatbelt device can be attached to the back frame 10. The back frame 10 includes a right side frame 11 extending in an upper and lower direction, a left side frame 12 extending in the upper and lower direction, an upper frame 13 connecting upper end portions of the right side frame 11 and the left side frame 12, and a lower frame 14 connecting lower end portions of the right side frame 11 and the left side frame 12. Here, the right side frame 11 and the left side frame 12 correspond to "a pair of side frames" in the claims.

Figure 4:
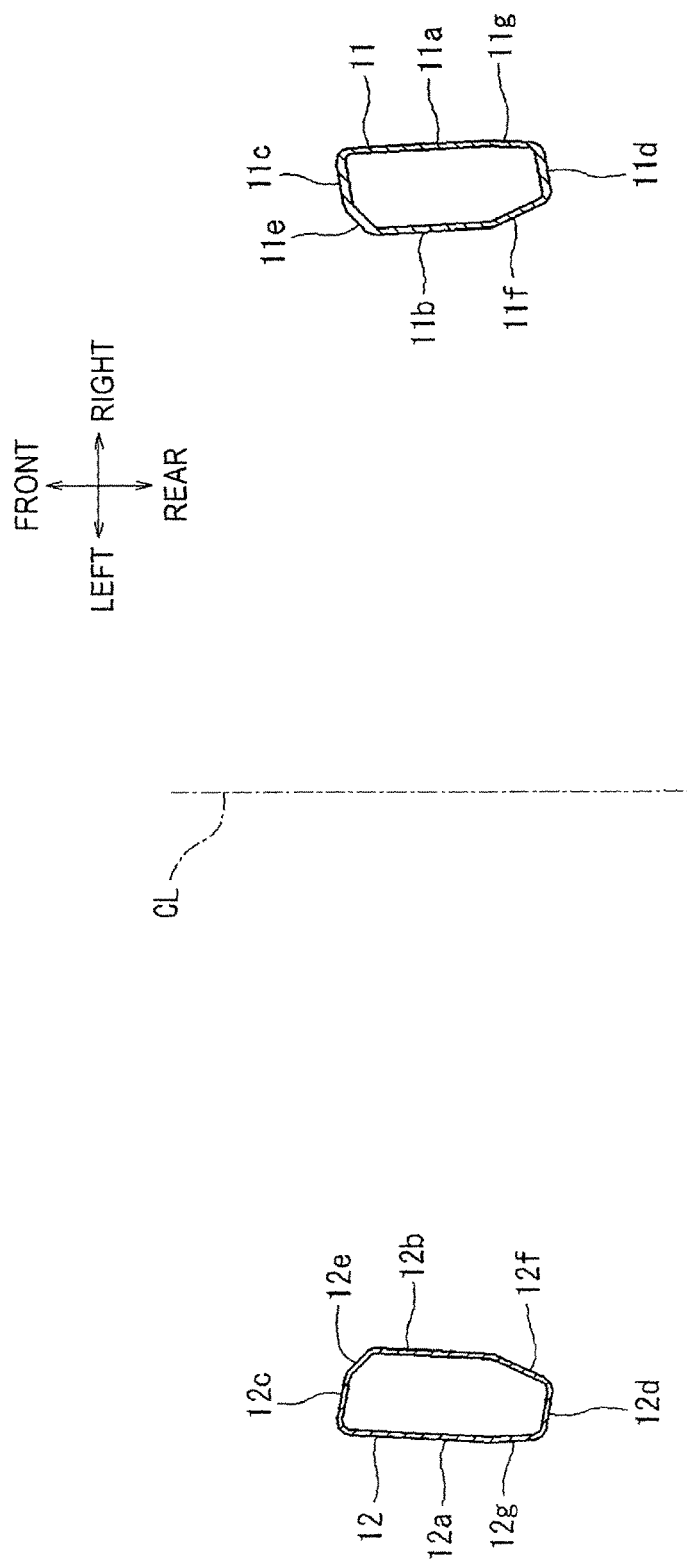
FIG. 4 is a sectional view taken along the line IV-IV in FIG. 3.

The right side frame 11 is made of an extruded material of an aluminum alloy having a sectional shape shown in FIG. 4 as a base. In FIG. 4, the cross section of the right side frame 11 has a deformed heptagonal shape. The right side frame 11 has a right surface portion 11a, a left surface portion 11b, a front surface portion 11c, a rear surface portion 11d, a front left chamfered portion 11e, a rear left chamfered portion 11f, and a rear right chamfered portion 11g. The right surface portion 11a and the left surface portion 11b extend parallel to each other while being slightly inclined to the left side (seat inward direction) with respect to a front and rear direction of the seat. The front surface portion 11c and the rear surface portion 11d extend parallel to each other while being slightly inclined to the rear side with respect to a left and right direction of the seat. The front left chamfered portion 11e is a portion that extends so as to connect a left end portion of the front surface portion 11c and a front end portion of the left surface portion 11b. The front left chamfered portion 11e has an inclination angle of about 45 degrees with respect to the left surface portion 11b. The rear left chamfered portion 11f is a portion that extends so as to connect a left end portion of the rear surface portion 11d and a rear end portion of the left surface portion 11b. The rear left chamfered portion 11f has an inclination angle of about 30 degrees with respect to the left surface portion 11b. The rear right chamfered portion 11g is a portion that extends so as to connect a right end portion of the rear surface portion 11d and a rear end portion of the right surface portion 11a. The rear right chamfered portion 11g has an inclination angle of about 5 degrees with respect to the right surface portion 11a. Here, the rear left chamfered portion 11f and the rear right chamfered portion 11g correspond to "a pair of left and right side surface portions" in the claims.

The left side frame 12 is made of an extruded material of an aluminum alloy having a sectional shape shown in FIG. 4 as a base. In FIG. 4, the cross section of the left side frame 12 has a deformed heptagonal shape. The left side frame 12 has a left surface portion 12a, a right surface portion 12b, a front surface portion 12c, a rear surface portion 12d, a front right chamfered portion 12e, a rear right chamfered portion 12f, and a rear left chamfered portion 12g. The left surface portion 12a and the right surface portion 12b extend parallel to each other while being slightly inclined to the right side (seat inward direction) with respect to the front and rear direction of the seat. The front surface portion 12c and the rear surface portion 12d extend parallel to each other while being slightly inclined to the rear side with respect to the left and right direction of the seat. The front right chamfered portion 12e is a portion that extends so as to connect a right end portion of the front surface portion 12c and a front end portion of the right surface portion 12b. The front right chamfered portion 12e has an inclination angle of about 45 degrees with respect to the right surface portion 12b. The rear right chamfered portion 12f is a portion that extends so as to connect a right end portion of the rear surface portion 12d and a rear end portion of the right surface portion 12b. The rear right chamfered portion 12f has an inclination angle of about 30 degrees with respect to the right surface portion 12b. The rear left chamfered portion 12g is a portion that extends so as to connect a left end portion of the rear surface portion 12d and a rear end portion of the left surface portion 12a. The rear left chamfered portion 12g has an inclination angle of about 5 degrees with respect to the left surface portion 12a. Here, the rear right chamfered portion 12f and the rear left chamfered portion 12g correspond to "a pair of left and right side surface portions" in the claims.

As shown in FIG. 4, an external line of the cross-sectional shape of the right side frame 11 and an external line of the cross-sectional shape of the left side frame 12 are in a line symmetrical relation with respect to a center line CL in the left and right direction of the back frame 10. Further, the thickness of the right surface portion 11a and the left surface portion 11b of the right side frame 11 is substantially equal to that of the left surface portion 12a and the right surface portion 12b of the left side frame 12. On the other hand, the thickness of the front surface portion 11c and the rear surface portion 11d of the right side frame 11 is approximately twice that of the front surface portion 12c and the rear surface portion 12d of the left side frame 12. The reason is that since a belt guide portion 23b for guiding a webbing of the seatbelt device is disposed on an upper side of the right side frame 11, and thus, a larger bending load in the front and rear direction is applied to the right side frame 11 than the left side frame 12, the geometrical moment of inertia of the right side frame 11 should be increased in order to counteract this situation. As shown in FIGS. 1 and 2, the right side frame 11 and the left side frame 12 are formed by bending the extruded material having a constant cross section area into a convex shape toward the front in the vicinity of the central portion in the upper and lower direction. Further, an upper arm 15 that is a press part made of iron is attached to the lower end side of the right side frame 11. The upper arm 15 is a part formed as one part by combining two parts in a state of facing each other. An upper portion of the upper arm 15 is formed as a side frame connection portion 15a so that an internal line of a horizontal section corresponds to an external line of the cross-sectional shape of the right side frame 11. Further, a lower portion of the upper arm 15 is formed as a flat plate-like recliner connection portion 15b and has recliner connection holes 15b1 formed therein. The lower end side of the right side frame 11 is fastened and connected by four rivets R in a state of being inserted into the side frame connection portion 15a of the upper arm 15. A recliner connection portion 12h is formed on a lower end side of the left side frame 12. The recliner connection portion 12h is configured such that the front surface portion 12c is expanded toward the front and recliner connection holes 12a1 for attaching a recliner are provided in the left surface portion 12a.

As shown in FIGS. 1 and 2, the upper frame 13 includes a main body part 20 having a substantially inverted U-shaped cross section opened downward, and a cover member 30 that is attached to a central portion on the lower opening side of the main body part 20 so as to cover the opening. The main body part 20 is a fiber-reinforced composite resin molded article obtained by curing a plurality of laminated carbon fiber fabrics with a matrix resin of epoxy resin. The main body part 20 has a front wall portion 21, a rear wall portion 22, an upper wall portion 23, a right wall portion 24, and a left wall portion 25.

The upper wall portion 23 has a central portion 23a located at the center in the left and right direction, the belt guide portion 23b located on the right end side, and a pedestal portion 23c located on the left end side. The central portion 23a is a surface portion which substantially horizontally extends in a standard state where the back frame 10 is erected with respect to a rear portion of a cushion frame and which extends in a direction substantially perpendicular to holder portions 32 (to be described later). A pair of holder insertion holes 23d penetrating in the upper and lower direction is provided at bilaterally symmetrical positions of the central portion 23a with respect to a center plane in the left and right direction. The belt guide portion 23b is a mountain-shape portion having a ridge line which is raised upwardly and inclined toward the right lower side in the left and right direction. The belt guide portion 23b functions to guide a webbing (not shown) of a seatbelt device released from a webbing take-up device (not shown) disposed inside a seat back from a back surface of the back frame 10 to a front surface of an upper body of a seated occupant. The pedestal portion 23c is a trapezoidal portion protruding slightly upward with respect to the central portion 23a and is provided for forming the shape of a shoulder portion of the seat back.

The front wall portion 21 extends forward and downward while forming an obtuse angle with respect to the central portion 23a of the upper wall portion 23. Further, the front wall portion 21 extends substantially parallel to the front surface portion 11c and the front surface portion 12c on the upper sides of the right side frame 11 and the left side frame 12 when the upper frame 13 is connected to the right side frame 11 and the left side frame 12. The rear wall portion 22 extends substantially parallel to the rear surface portion lid and the rear surface portion 12d on the upper sides of the right side frame 11 and the left side frame 12 when the upper frame 13 is connected to the right side frame 11 and the left side frame 12. That is, the front wall portion 21 and the rear wall portion 22 extend forward and downward substantially in parallel with each other. Right end portions of the upper wall portion 23, the front wall portion 21 and the rear wall portion 22 are connected by the right wall portion 24, and left end portions of the upper wall portion 23, the front wall portion 21 and the rear wall portion 22 are connected by the left wall portion 25, thereby forming the substantially box-shaped main body part 20 opened downward.

When the upper frame 13 is put on the upper end sides of the right side frame 11 and the left side frame 12 from above, the left side surface of the right wall portion 24 is formed to be abutted against the right side surfaces of the right surface portion 11a and the rear right chamfered portion 11g of the right side frame 11. Further, when the upper frame 13 is put on the upper end sides of the right side frame 11 and the left side frame 12 from above, the right side surface of the left wall portion 25 is formed to be abutted against the left side surfaces of the left surface portion 12a and the rear left chamfered portion 12g of the left side frame 12.

As shown in FIGS. 1 and 2, the cover member 30 is a die-cast molded article of aluminum. The cover member 30 includes a base portion 31 having a substantially rectangular shape in a plan view, and a pair of rectangular tubular holder portions 32 standing on the base portion 31. The base portion 31 has an upper wall surface portion 31a, a front wall surface portion 31b, and a rear wall surface portion 31c. The pair of holder portions 32 is erected on the rear side of the left and right end portions of the upper wall surface portion 31a. Headrest supports 40 can be inserted into the inner tubes of the holder portion 32 so as to penetrate in the upper and lower direction. The cover member 30 is assemble to the main body part 20 in a state where the upper end sides of the pair of holder portions 32 are inserted into the pair of holder insertion holes 23d of the main body part 20 from below, respectively. Specifically, a lower end side of the front wall portion 21 of the main body part 20 and the front wall surface portion 31b of the cover member 30 are brought into contact with each other and fixedly fastened by two rivets R in a state where about ⅓ of the length from the upper end portions of the holder portions 32 in the upper and lower direction is exposed from the upper surface of the central portion 23a. Further, in the same state, a connection surface portion 22b of the rear wall portion 22 of the main body part 20 and a rear wall surface portion 31c of the cover member 30 are brought into contact with each other and fixedly fastened by two rivets R. In this manner, the cover member 30 is fixed to the front wall portion 21 and the rear wall surface portion 31c corresponding to the central portion 23a of the upper wall portion 23 of the main body part 20, and this portion has a closed sectional structure.

As shown in FIGS. 1, 2 and 5 to 7, the lower frame 14 has a substantially U-shape in a front view, and is a fiber-reinforced composite resin molded article obtained by curing a plurality of laminated carbon fiber fabrics with a matrix resin of epoxy resin. The lower frame 14 has a main portion 14a, a right connection portion 14b which is located on the right side of the main portion 14a and is a connection portion with a lower end side of the right side frame 11 and the upper arm 15, and a left connection portion 14c which is a connection portion with a lower end side of the left side frame 12. Ribs (not shown) are provided in the main portion 14a to enhance rigidity. The main portion 14a has a lower end portion 14a1 connecting a lower end portion of the right side frame 11 and a lower end portion of the left side frame 12 and extending in the left and right direction, and an upper end portion 14a2 connecting a portion slightly below the central portion in the upper and lower direction of the right side frame 11 and a portion slightly below the central portion in the upper and lower direction of the left side frame 12 and extending in a hanging line in the left and right direction. That is, the height of the main portion 14a from the lower end portion 14a1 is lower at the central portion in the left and right direction and gradually increases toward the right connection portion 14b and the left connection portion 14c. Here, the right connection portion 14b and the left connection portion 14c correspond to the "reinforcing member" in the claims, respectively.

A cross section of the right connection portion 14b taken along a horizontal plane has a substantially U-shape opened forward. The right connection portion 14b has a right surface portion 14b1, a rear surface portion 14b2, and a left surface portion 14b3 corresponding to the rear right chamfered portion 11g, the rear surface portion 11d, the rear left chamfered portion 11f of the right side frame 11, respectively. The right surface portion 14b1 and the left surface portion 14b3 are formed of a fiber-reinforced composite resin having substantially the same thickness as the main portion 14a. The rear surface portion 14b2 has a front-side rear surface portion 14b21 which is in contact with and connected to the rear surface portion 11d of the right side frame 11, and a rear-side rear surface portion 14b22 which is disposed behind the front-side rear surface portion 14b21 with a rigid foam 14b23 of urethane resin or the like interposed therebetween. The rear surface portion 14b2 is formed in a thick-walled layered structure. The front-side rear surface portion 14b21 and the rear-side rear surface portion 14b22 are formed of a fiber-reinforced composite resin having substantially the same thickness as the main portion 14a. The rigid foam 14b23 is a member having a density lower than the front-side rear surface portion 14b21 and the rear-side rear surface portion 14b22. The thickness of the rigid foam 14b23 in the front and rear direction gradually increases from the upper side toward the lower side. In this way, the rear surface portion 14b2 is configured in such a manner that a gap between the front surface of the front-side rear surface portion 14b21 and the rear surface of the rear-side rear surface portion 14b22 is narrow at the upper end side and is continuously widened toward the lower end side. Here, the right surface portion 14b1 and the left surface portion 14b3 correspond to "a pair of left and right side wall portions" in the claims. Further, the rear surface portion 14b2 and the rigid foam 14b23 correspond to the "rear wall portion" and "lightweight member" in the claims, respectively.

The left connection portion 14c is basically formed similarly to the right connection portion 14b. A cross section of the left connection portion 14c taken along a horizontal plane has a substantially U-shape opened forward. The left connection portion 14c has a left surface portion 14c1, a rear surface portion 14c2, and a right surface portion 14c3 corresponding to the rear left chamfered portion 12g, the rear surface portion 12d, and the rear right chamfered portion 12f of the left side frame 12, respectively. The left surface portion 14c1 and the right surface portion 14c3 are formed of a fiber-reinforced composite resin having substantially the same thickness as the main portion 14a. The rear surface portion 14c2 has a front-side rear surface portion 14c21 which is in contact with and connected to the rear surface portion 12d of the left side frame 12, and a rear-side rear surface portion 14c22 which is disposed behind the front-side rear surface portion 14c21 with a rigid foam 14c23 of urethane resin or the like interposed therebetween. The rear surface portion 14c2 is formed in a thick-walled layered structure. The front-side rear surface portion 14c21 and the rear-side rear surface portion 14c22 are formed of a fiber-reinforced composite resin having substantially the same thickness as the main portion 14a. The rigid foam 14c23 is a member having a density lower than the front-side rear surface portion 14c21 and the rear-side rear surface portion 14c22. The thickness of the rigid foam 14c23 in the front and rear direction gradually increases from the upper side toward the lower side. In this way, the rear surface portion 14c2 is configured in such a manner that a gap between the front surface of the front-side rear surface portion 14c21 and the rear surface of the rear-side rear surface portion 14c22 is narrow at the upper end side and is continuously widened toward the lower end side. Here, the left surface portion 14c1 and the right surface portion 14c3 correspond to "a pair of left and right side wall portions" in the claims. Further, the rear surface portion 14c2 and the rigid foam 14c23 correspond to the "rear wall portion" and the "lightweight member" in the claims, respectively.

The lower frame 14 is manufactured as follows. When upper and lower molds are closed, a predetermined number of fabrics made of carbon fibers are placed in a cavity of the mold which has the same shape as the lower frame 14 and is formed between the upper and lower molds so as to overlap with each other. Liquid epoxy resin before being cured is poured into the cavity. Then, the epoxy resin is reacted and cured, and demolding is performed. Here, in the right connection portion 14b of the lower frame 14, the liquid epoxy resin before being cured is poured in a state where the rigid foam 14b23 is positioned between a predetermined number of overlapped carbon fiber fabrics forming the front-side rear surface portion 14b21 and a predetermined number of overlapped carbon fiber fabrics forming the rear-side rear surface portion 14b22. The same is applied to the left connection portion 14c of the lower frame 14.

As shown in FIGS. 1 and 2, the upper frame 13 is put on the upper end sides of the right side frame 11 and the left side frame 12 from above. In this state, the right wall portion 24 and the left wall portion 25 of the upper frame 13 are brought into contact with the right surface portion 11a and the rear right chamfered portion 11g of the right side frame 11 and the left surface portion 12a and the rear left chamfered portion 12g of the left side frame 12 and are fixedly fastened thereto by four rivets R, respectively. Then, the upper arm 15 is attached to the lower end side of the right side frame 11. In this state, the right connection portion 14b of the lower frame 14 is put on the lower end side of the right side frame 11 from the rear side. The rear right chamfered portion 11g of the right side frame 11 and the right surface portion 14b1 of the lower frame 14 are brought into contact with each other and fixedly fastened by four rivets R. Further, in the same state, the rear left chamfered portion 11f of the right side frame 11 and the left surface portion 14b3 of the lower frame 14 are brought into contact with each other and fixedly fastened by three rivets R. At this time, a room temperature curing type epoxy adhesive Ad is interposed between the rear surface portion 11d of the right side frame 11 and the front-side rear surface portion 14b21 of the lower frame 14. The epoxy adhesive Ad is fully cured in several hours to enhance the bonding strength between the right side frame 11 and the right connection portion 14b of the lower frame 14.

Figure 5:
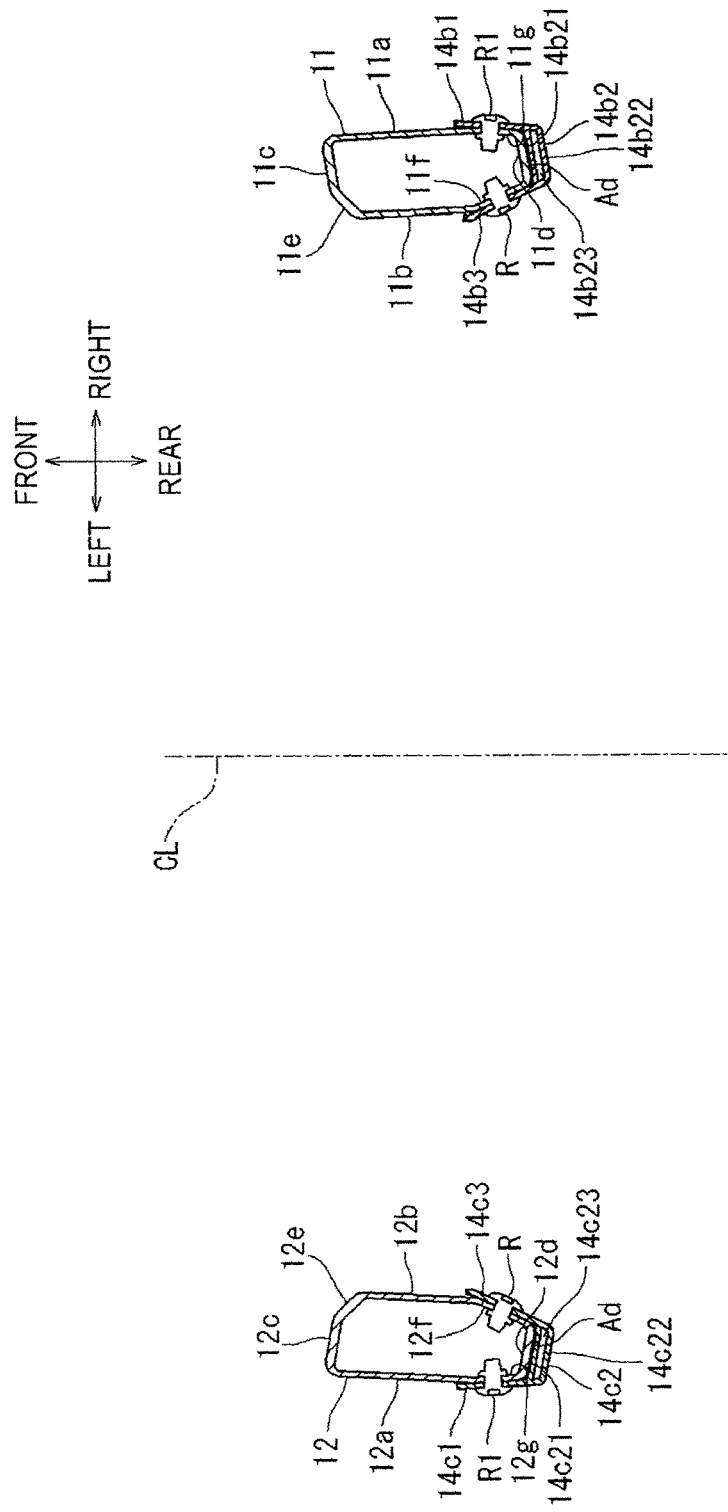
FIG. 5 is a sectional view taken along the line V-V in FIG. 3.
Figure 6:
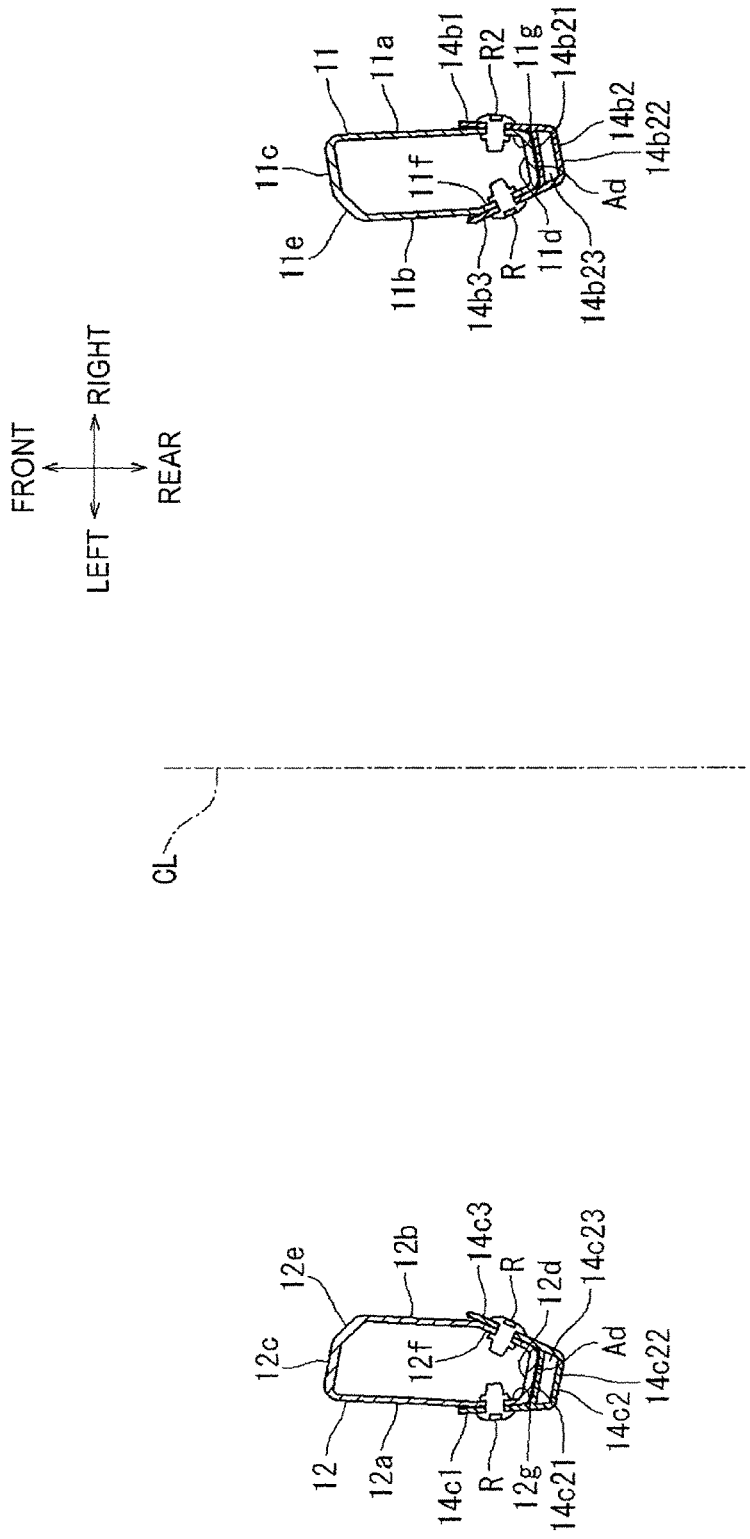
FIG. 6 is a sectional view taken along the line VI-VI in FIG. 3.
Figure 7:
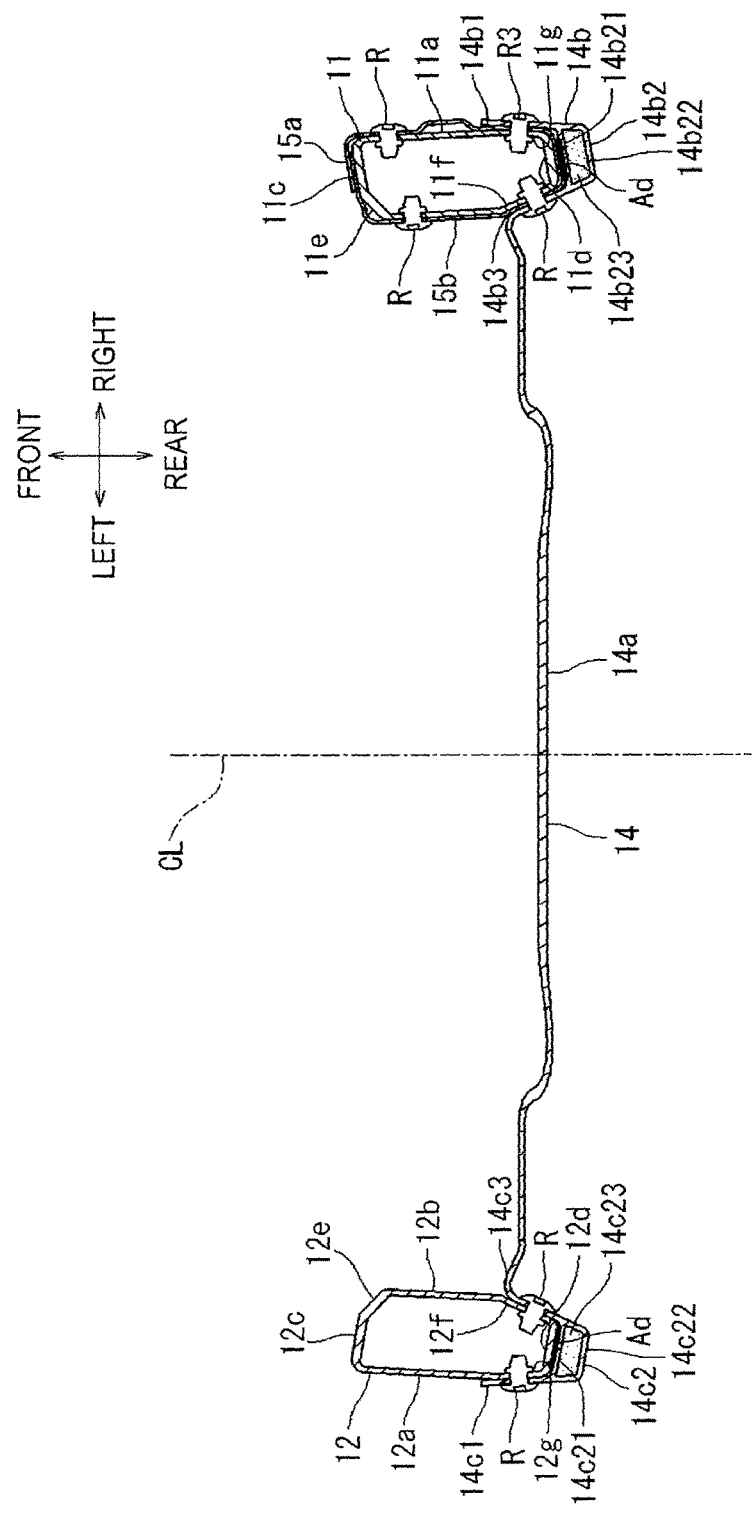
FIG. 7 is a sectional view taken along the line VII-VII in FIG. 3.

Here, FIG. 5 shows a section taken along an uppermost rivet R1, FIG. 6 shows a section taken along a second rivet R2 from above, and FIG. 7 shows a section taken along a lowermost rivet R3. A gap between the front surface of the front-side rear surface portion 14b21 of the lower frame 14, which is brought into contact with and bonded to the rear surface of the rear surface portion 11d of the right side frame 11, and the rear surface of the rear-side rear surface portion 14b22 of the lower frame 14 is widened downward. Further, the rigid foam 14b23 is disposed between the rear surface of the front-side rear surface portion 14b21 and the front surface of the rear-side rear surface portion 14b22. Therefore, in the section taken along a horizontal plane formed by the right side frame 11 and the right connection portion 14b of the lower frame 14, the geometrical moment of inertia about an axis extending in the left and right direction increases downward and the bending rigidity in the front and rear direction of the right side frame 11 increases. In particular, since the rear surface portion 11d of the right side frame 11 and the front-side rear surface portion 14b1 of the lower frame 14 are bonded to each other, the integrity of the lower frame 14 to the right side frame 11 increases and the bending rigidity in the front and rear direction is enhanced, as compared with the case where the bonding is not performed.

The method of attaching the left connection portion 14c of the lower frame 14 to the lower end side of the left side frame 12 is basically the same as the method of attaching the right connection portion 14b of the lower frame 14 to the lower end side of the right side frame 11 from the rear side. The left connection portion 14c of the lower frame 14 is put on the lower end side of the left side frame 12 from the rear side, and the rear left chamfered portion 12g of the left side frame 12 and the left surface portion 14c1 of the lower frame 14 are brought into contact with each other and fixedly fastened by three rivets R. Further, in the same state, the rear right chamfered portion 12f of the left side frame 12 and the right surface portion 14c3 of the lower frame 14 are brought into contact with each other and fixedly fastened by three rivets R. At this time, a room temperature curing type epoxy adhesive is interposed between the rear surface portion 12d of the left side frame 12 and the front-side rear surface portion 14c21 of the lower frame 14. The epoxy adhesive is fully cured in several hours to enhance the bonding strength between the left side frame 12 and the left connection portion 14c of the lower frame 14.

Here, as shown in FIGS. 5 to 7, a gap between the front surface of the front-side rear surface portion 14c21 of the lower frame 14, which is brought into contact with and bonded to the rear surface portion 12d of the left side frame 12, and the rear surface of the rear-side rear surface portion 14c22 of the lower frame 14 is widened downward. Further, the rigid foam 14c23 is disposed between the rear surface of the front-side rear surface portion 14b21 and the front surface of the rear-side rear surface portion 14c22. Therefore, in the section taken along a horizontal plane formed by the left side frame 12 and the left connection portion 14c of the lower frame 14, the geometrical moment of inertia about an axis extending in the left and right direction increases downward and the bending rigidity in the front and rear direction of the left side frame 12 increases. In particular, since the rear surface portion 12d of the left side frame 12 and the front-side rear surface portion 14c21 of the lower frame 14 are bonded to each other, the integrity of the lower frame 14 to the left side frame 12 increases and the bending rigidity in the front and rear direction is enhanced, as compared with the case where the bonding is not performed. In this way, the left side frame 12, the right side frame 11, the upper frame 13, and the lower frame 14 are connected to form a substantially rectangular back frame 10 in a front view. In the back frame 10, the recliner connecting portion 15b of the upper arm 15 and the recliner connecting portion 12h of the left side frame 12 are attached to rear end sides of a seat cushion frame (not shown) via recliners (not shown), respectively.

The present embodiment configured as described above provided the following operational effects. The lower end side of the right side frame 11 is connected to the right connection portion 14b of the lower frame 14, and the lower end side of the left side frame 12 is connected to the left connection portion 14c of the lower frame 14. Here, the right surface portion 14b1, the rear surface portion 14b2, and the left surface portion 14b3 of the lower frame 14 are connected to the rear right chamfered portion 11g, the rear surface portion 11d, and the rear left chamfered portion 11f in the cross section of the right side frame 11 by being put thereon from the outside. Further, the front surface of the front-side rear surface portion 14b21 of the rear surface portion 14b2 of the lower frame 14 is in contact with and bonded and connected to the rear surface of the rear surface portion 11d of the right side frame 11. At this time, the gap between the front surface of the front-side rear surface portion 14b21 of the lower frame 14 and the rear surface of the rear-side rear surface portion 14b22 of the lower frame 14 is widened downward. Therefore, in the portion where the right side frame 11 and the right connection portion 14b of the lower frame 14 are connected, the right side frame 11 and the lower frame 14 are integrated, and the geometrical moment of inertia about an axis extending in the left and right direction gradually increases from the upper side to the lower side. In particular, since the front surface of the front-side rear surface portion 14b21 of the lower frame 14 is in contact with and connected to the rear surface of the rear surface portion 11d of the right side frame 11 by bonding, the right connection portion 14b of the lower frame 14 is integrated with the right side frame 11 to contribute to enhancing the bending rigidity in the front and rear direction. That is, it is possible to enhance the bending rigidity in the front and rear direction of the right side frame 11 by connecting the lower frame 14 to the right connection portion 14b of the right side frame 11. The relationship between the left side frame 12 and the left connection portion 14c of the lower frame 14 is also similar to the relationship between the right side frame 11 and the right connection portion 14b of the lower frame 14 described above.

Further, in the rear surface portion 11d of the right side frame 11, the rigid foam 14b23 is inserted between the front-side rear surface portion 14b21 and the rear-side rear surface portion 14b22. In this way, the weight of the back frame 10 can be reduced while enhancing the geometrical moment of inertia about an axis extending in the left and right direction by increasing the thickness of the rear surface portion 14b2. In this regard, the relationship between the left side frame 12 and the left connection portion 14c of the lower frame 14 is also similar to the relationship between the right side frame 11 and the right connection portion 14b of the lower frame 14 described above. Furthermore, since it is possible to enhance the bending rigidity of the right side frame 11 and the left side frame 12 in the front and rear direction by utilizing the lower frame 14, an increase in the number of parts can be suppressed and the rigidity of the back frame 10 in the left and right direction can be also enhanced.

Figure 8:
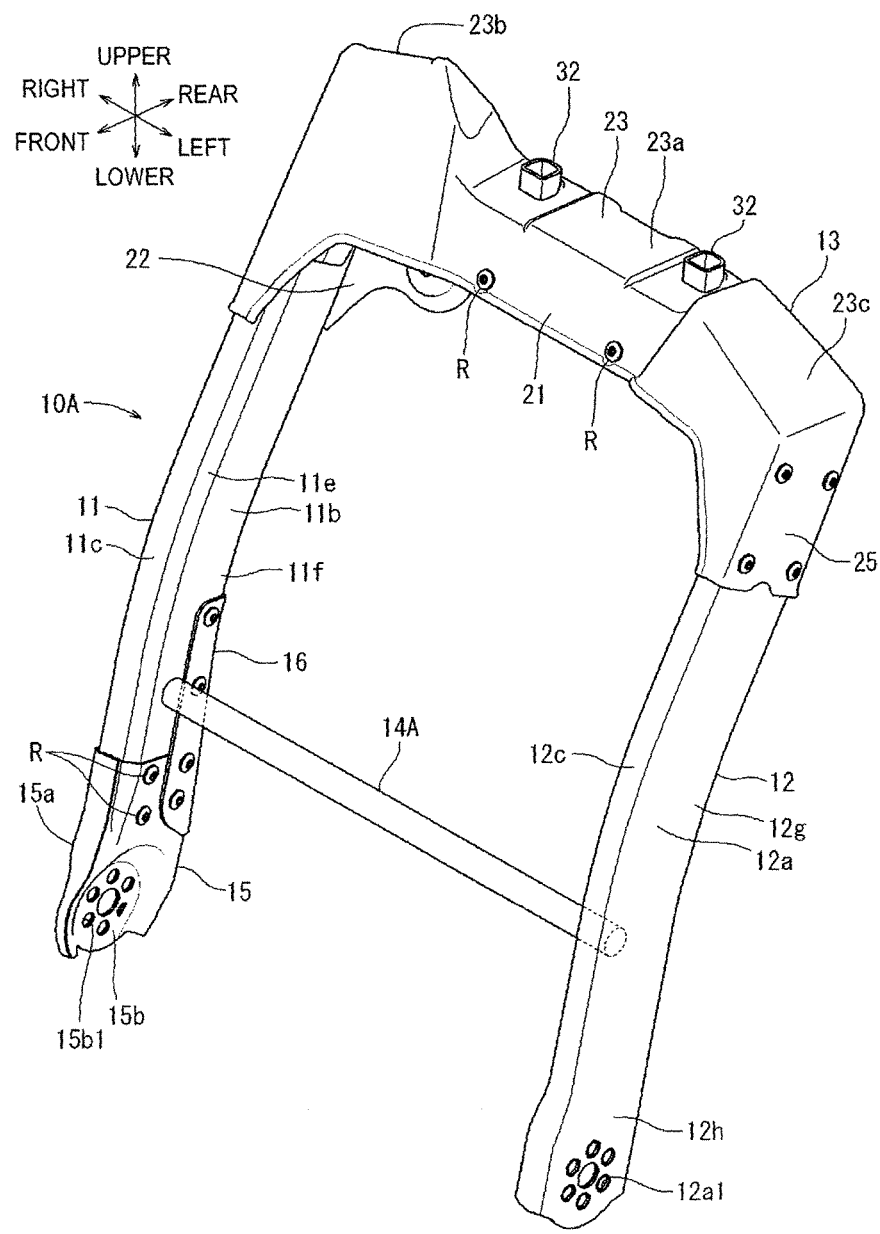
FIG. 8 is a perspective view of a back frame of a right automobile seat according to a second embodiment of the disclosure.
Figure 9:
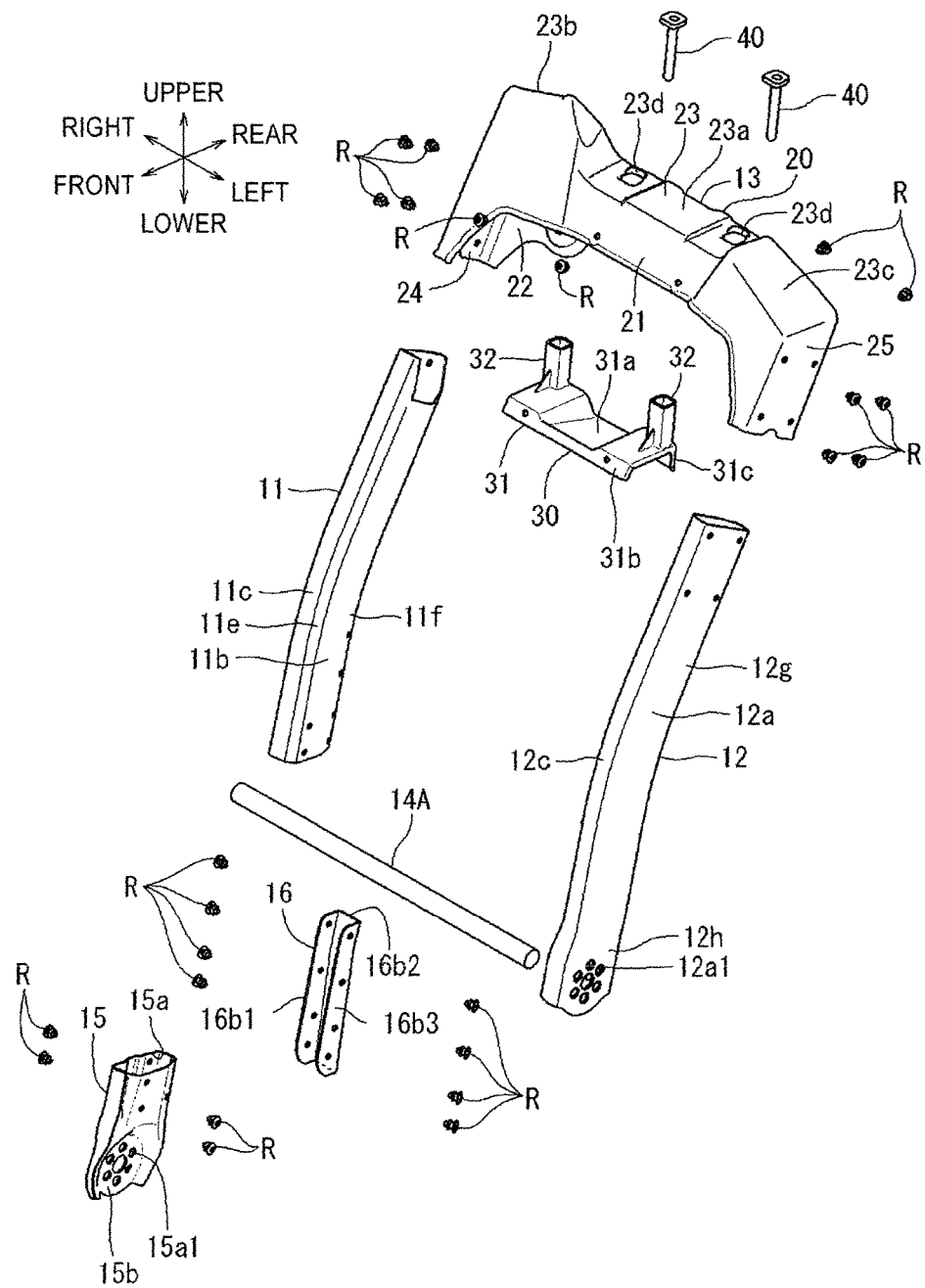
FIG. 9 is an exploded perspective view of the back frame according to the above embodiment.
Figure 10:
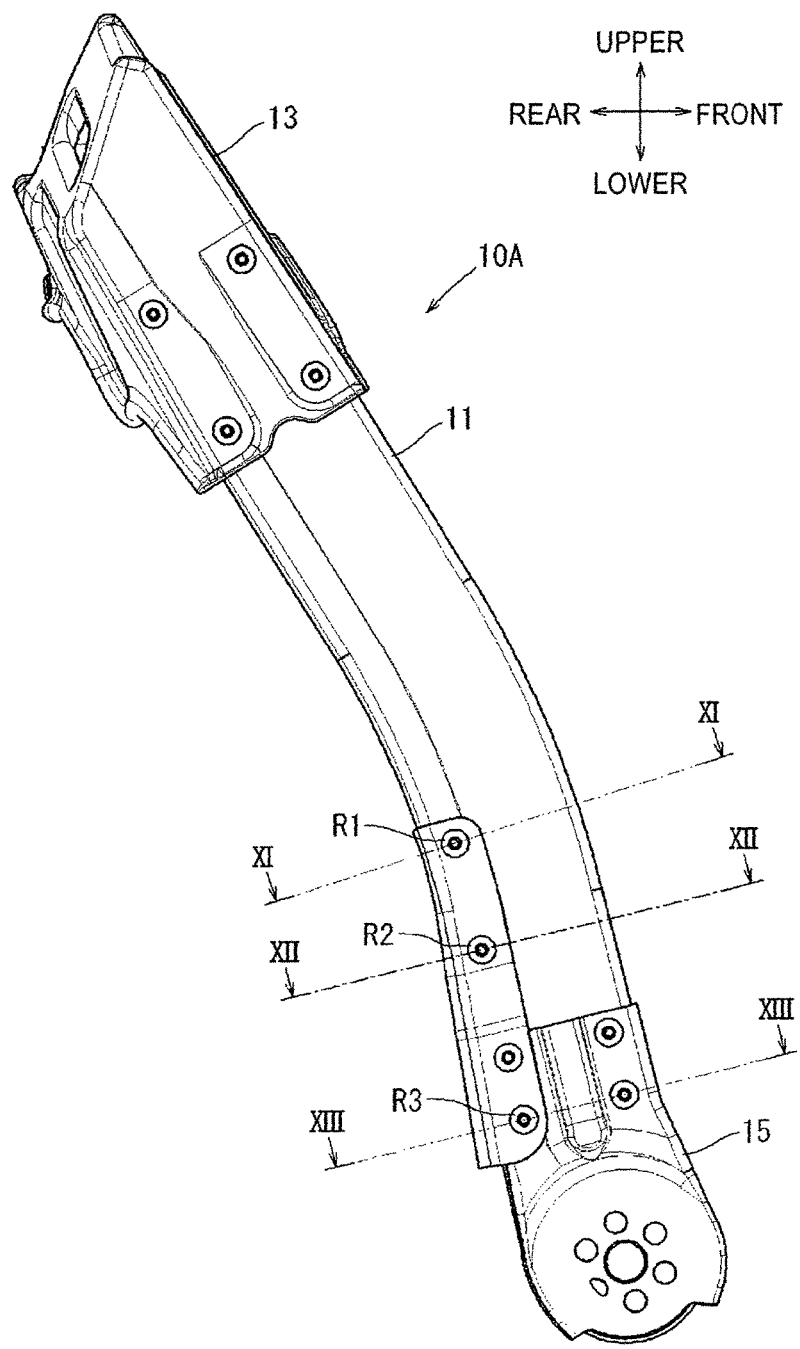
FIG. 10 is a right side view of the back frame according to the above embodiment.

FIGS. 8 to 13 show a back frame 10A according to a second embodiment of the disclosure. Corresponding reference numerals are attached to the structures common to the first embodiment, and the detailed description thereof will be omitted. The difference from the first embodiment is that a reinforcing member is not integrated with the lower frame but is attached only to the right side frame 11. As shown in FIGS. 8 and 9, the lower frame 14A is a pipe-shaped frame extending in the left and right direction and is disposed in a bridging manner between the lower end side of the right side frame 11 and the lower end side of the left side frame 12. A reinforcing member 16 is a fiber-reinforced composite resin molded article obtained by curing a plurality of laminated carbon fiber fabrics with a matrix resin of epoxy resin. The reinforcing member 16 is formed in such a manner that a cross section taken along a horizontal plane has a substantially U shape opened forward. The reinforcing member 16 has a right surface portion 16b1, a rear surface portion 16b2, and a left surface portion 16b3 corresponding to the rear right chamfered portion 11g, the rear surface portion 11d, and the rear left chamfered portion 11f of the right side frame 11, respectively. The right surface portion 16b1 and the left surface portion 16b3 are formed of a fiber-reinforced composite resin having substantially the same thickness. The rear surface portion 16b2 has a front-side rear surface portion 16b21 which is in contact with and connected to the rear surface portion 11d of the right side frame 11, and a rear-side rear surface portion 16b22 which is disposed behind the front-side rear surface portion 16b21 with a rigid foam 16b23 of urethane resin or the like interposed therebetween. The rear surface portion 16b2 is formed in a thick-walled layered structure. The front-side rear surface portion 16b21 and the rear-side rear surface portion 16b22 are formed of a fiber-reinforced composite resin having substantially the same thickness as the right surface portion 16*b*1 and the left surface portion 16*b*3. The rigid foam 16*b*23 is a member having a density lower than the front-side rear surface portion 16*b*21 and the rear-side rear surface portion 16*b*22. The thickness of the rigid foam 16*b*23 in the front and rear direction gradually increases from the upper side toward the lower side. In this way, the rear surface portion 16*b*2 is configured in such a manner that a gap between the front surface of the front-side rear surface portion 16*b*21 and the rear surface of the rear-side rear surface portion 16*b*22 is narrow at the upper end side and is continuously widened toward the lower end side. That is, the reinforcing member 16 has substantially the same shape as the right connection portion 14*b* of the lower frame 14 of the first embodiment. The method of manufacturing the reinforcing member 16 is the same as the method of manufacturing the lower frame 14. Here, the right surface portion 16*b*1 and the left surface portion 16*b*3 correspond to "a pair of left and right side wall portions" in the claims. Further, the rear surface portion 16*b*2 and the rigid foam 16*b*23 correspond to the "rear wall portion" and the "lightweight member" in the claims, respectively.

Figure 11:
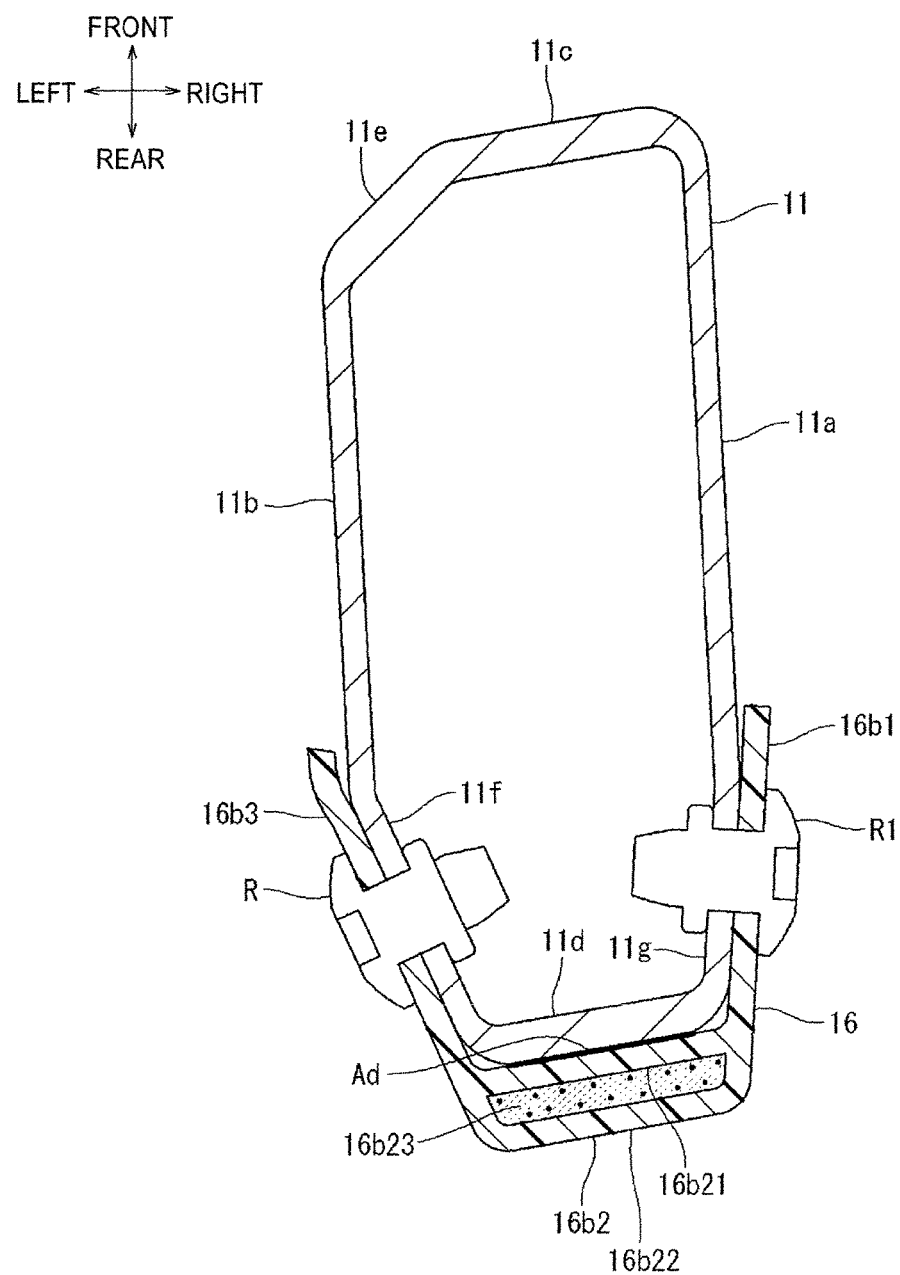
FIG. 11 is a sectional view taken along the line XI-XI in FIG. 10.
Figure 12:
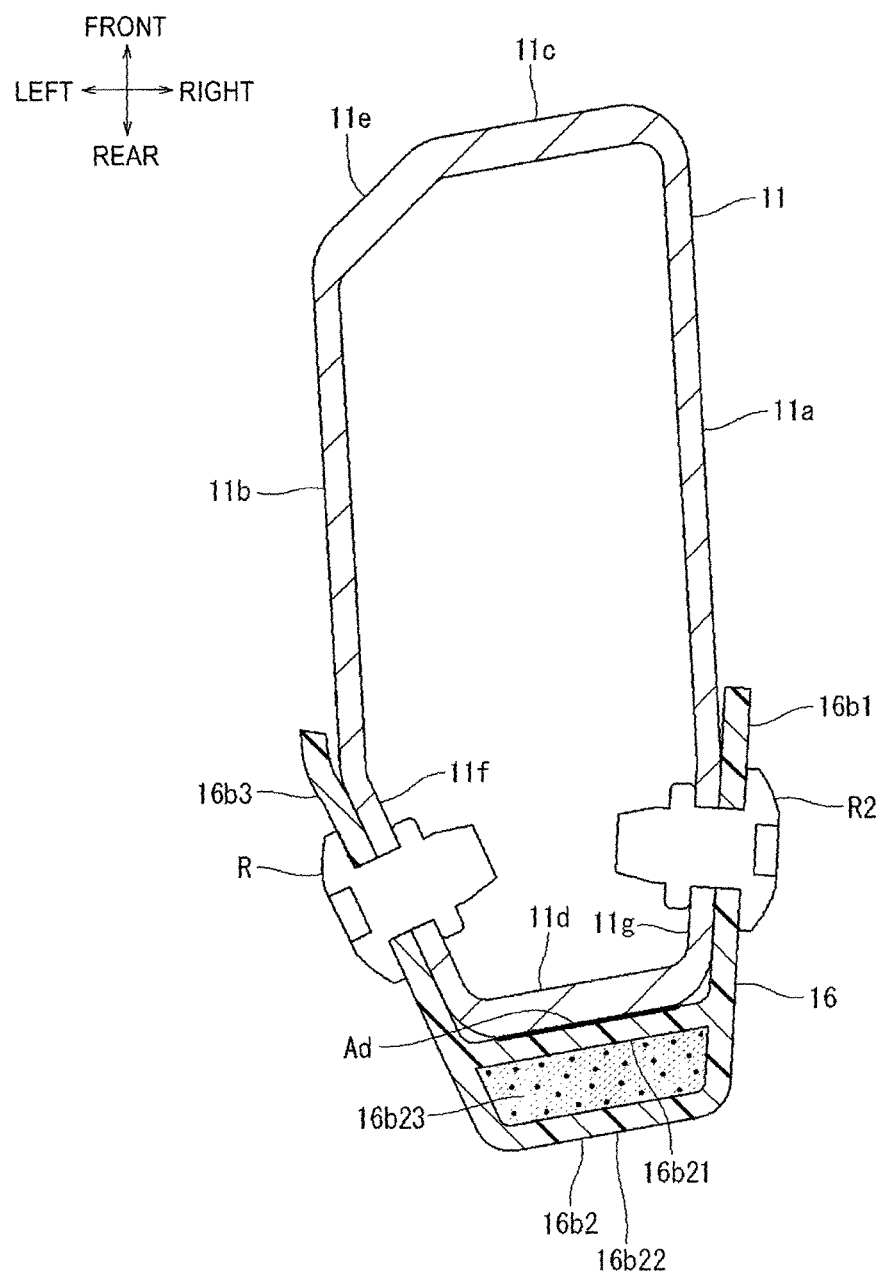
FIG. 12 is a sectional view taken along the line XII-XII in FIG. 10.
Figure 13:
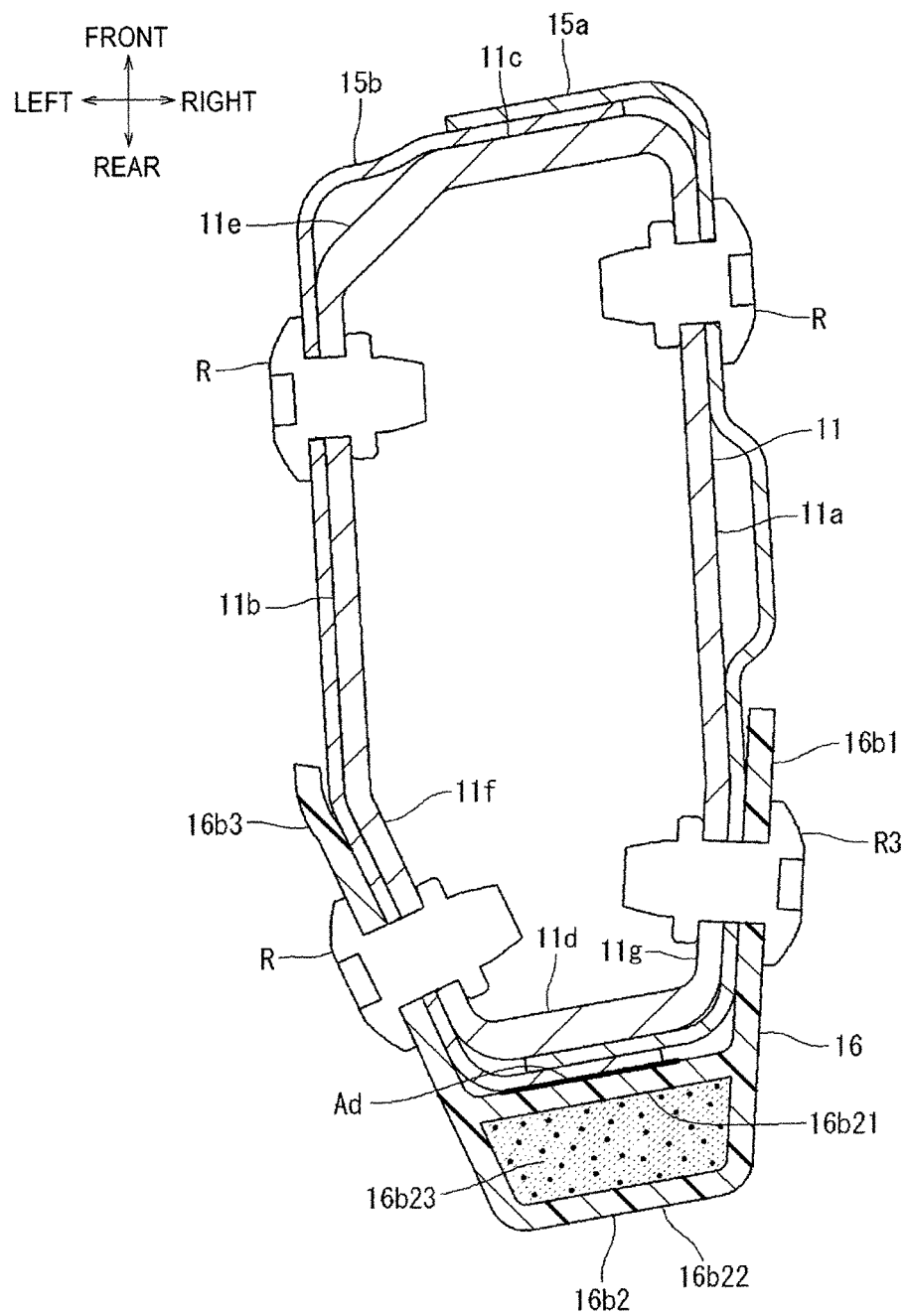
FIG. 13 is a sectional view taken along the line XIII-XIII in FIG. 10.

As shown in FIGS. 11 to 13, the upper arm 15 is attached to the lower end side of the right side frame 11. In this state, the reinforcing member 16 is put on the lower end side of the right side frame 11 from the rear side. The rear right chamfered portion 11*g* of the right side frame 11 and the right surface portion 16*b*1 of the reinforcing member 16 are brought into contact with each other and fixedly fastened by four rivets R. Further, in the same state, the rear left chamfered portion 11*f* of the right side frame 11 and the left surface portion 16*b*3 of the reinforcing member 16 are brought into contact with each other and fixedly fastened by three rivets R. At this time, the room temperature curing type epoxy adhesive Ad is interposed between the rear surface portion 11*d* of the right side frame 11 and the front-side rear surface portion 16*b*21 of the reinforcing member 16. The epoxy adhesive Ad is fully cured in several hours to enhance the bonding strength between the right side frame 11 and the reinforcing member 16.

Here, FIG. 11 shows a section taken along the uppermost rivet R1, FIG. 12 shows a section taken along the second rivet R2 from above, and FIG. 13 shows a section taken along the lowermost rivet R3. A gap between the front surface of the front-side rear surface portion 16*b*21 of the reinforcing member 16, which is brought into contact with and bonded to the rear surface of the rear surface portion 11*d* of the right side frame 11, and the rear surface of the rear-side rear surface portion 16*b*22 of the reinforcing member 16 is widened downward. Further, the rigid foam 16*b*23 is disposed between the rear surface of the front-side rear surface portion 16*b*21 and the front surface of the rear-side rear surface portion 16*b*22. Therefore, in the section taken along a horizontal plane formed by the right side frame 11 and the reinforcing member 16, the geometrical moment of inertia about an axis extending in the left and right direction increases downward and the bending rigidity in the front and rear direction of the right side frame 11 increases. In particular, since the rear surface portion 11*d* of the right side frame 11 and the front-side rear surface portion 16*b*21 of the reinforcing member 16 are bonded to each other, the geometrical moment of inertia about an axis extending in the left and right direction increases, as compared with the case where the bonding is not performed. Meanwhile, the reinforcing member 16 is attached only to the right side frame 11. This is to cope with a strong forward bending force applied to the right side frame 11 from a seatbelt at the time of front collision of a vehicle.

The present embodiment configured as described above has the following operational effects. The reinforcing member 16 is attached to the lower end side of the right side frame 11. Here, the right surface portion 16*b*1, the rear surface portion 16*b*2, and the left surface portion 16*b*3 of the reinforcing member 16 are connected to the rear right chamfered portion 11*g*, the rear surface portion 11*d*, and the rear left chamfered portion 11*f* in the cross section of the right side frame 11 by being put thereon from the outside. Further, the front surface of the front-side rear surface portion 16*b*21 of the rear surface portion 16*b*2 of the reinforcing member 16 is in contact with, bonded and connected to the rear surface of the rear surface portion 11*d* of the right side frame 11. At this time, the gap between the front surface of the front-side rear surface portion 16*b*21 of the reinforcing member 16 and the rear surface of the rear-side rear surface portion 16*b*22 of the reinforcing member 16 is widened downward. In this way, in the portion where the right side frame 11 and the reinforcing member 16 are connected, the right side frame 11 and the reinforcing member 16 are integrated and the geometrical moment of inertia about an axis extending in the left and right direction gradually increases from the upper side to the lower side. In particular, since the front surface of the front-side rear surface portion 16*b*21 of the reinforcing member 16 is in contact with and connected to the rear surface of the rear surface portion 11*d* of the right side frame 11 by bonding, the reinforcing member 16 is integrated with the right side frame 11 to contribute to enhancing the bending rigidity in the front and rear direction. That is, it is possible to enhance the bending rigidity in the front and rear direction of the right side frame 11 by connecting the reinforcing member 16 to the right side frame 11. Further, in the rear surface portion 11*d* of the right side frame 11, the rigid foam 16*b*23 is inserted between the front-side rear surface portion 16*b*21 and the rear-side rear surface portion 16*b*22. In this way, the weight of the back frame 10 can be reduced while enhancing the geometrical moment of inertia about an axis extending in the left and right direction by increasing the thickness of the rear surface portion 16*b*2.

Although specific embodiments have been described above, the disclosure is not limited to the appearances and configurations in these embodiments, and various modifications, additions and deletions can be made without changing the spirit of the disclosure. For example, the following configurations can be adopted.

1. In the above embodiment, the rear surface portion 14*b*2 and the rear surface portion 14*c*2 of the lower frame 14 and the rear surface portion 16*b*2 of the reinforcing member 16 are formed as a three-layer structure. However, a two-layer structure may be adopted. The rear surface portion 16*b*2 of the reinforcing member 16 is representatively described. The rear surface portion 16*b*21 on the front side may be omitted, and the rigid foam 16*b*23 and the rear surface portion 16*b*22 on the rear side may be formed as a two-layer structure. In this case, the front surface of the rigid foam 16*b*23 is connected to the rear surface of the rear surface portion 11*d* of the right side frame 11 by bonding.

2. In the above embodiment, the lower frame 14 and the reinforcing member 16 are fiber-reinforced composite resin molded articles obtained by curing a carbon fiber fabric with a matrix resin of epoxy resin. However, the disclosure is not limited thereto. For example, the lower frame 14 and the reinforcing member 16 may be fiber-reinforced composite resin molded articles obtained by curing glass fiber fabric or aramid fiber fabric with unsaturated polyester resin. Alternatively, the lower frame 14 and the reinforcing member 16 may be stampable resin molded articles in which short fibers of carbon or glass are contained in a thermoplastic resin.

3. In the above embodiment, the room temperature curing type epoxy adhesive Ad is used for bonding the right side frame 11 to the lower frame 14 and the reinforcing member 16. However, the disclosure is not limited thereto. For example, the right side frame 11 and the lower frame 14 and the reinforcing member 16 may be heated and cured on a seat production line by using a heat curing type epoxy adhesive. Further, the material of the adhesive is not particularly limited. In addition, the right side frame 11 and the lower frame 14 and the reinforcing member 16 may be connected by fusion due to the melting of the hot-melt adhesive or the constituent material of the reinforcing member 16 itself, or may be connected by adhesion of a double-sided tape or the like.

4. In the above embodiment, the disclosure is applied to a back frame of an automobile seat. However, the disclosure may be applied to a back frame of a seat mounted on an airplane, a ship, a train, or the like.

The disclosure provides illustrative, non-limiting examples as follows:

A first aspect of the present disclosure is a first aspect of the present disclosure is a back frame of a vehicle seat including: a pair of left and right side frames extending in an upper and lower direction; an upper frame connecting upper end sides of the pair of side frames in a bridging manner; and a reinforcing member attached to a rear side of a lower end side of at least one of the pair of side frames by being put thereon from the outside, wherein the at least one of the pair of side frames has a closed cross section and has a pair of left and right side surface portions and a rear surface portion connecting rear end portions of the pair of left and right side surface portions, and the pair of left and right side surface portions and the rear surface portion are connected in a substantially U-shape opened forward, wherein and the reinforcing member has an opened cross section and has a pair of left and right side wall portions and a rear wall portion connecting rear end portions of the pair of left and right side wall portions, and the pair of left and right side wall portions and the rear wall portion are connected in a substantially U-shape opened forward, wherein the rear wall portion is thicker than the pair of left and right side wall portions, and wherein in a state where the reinforcing member is put on the at least one of the pair of side frames, the pair of left and right side wall portions is in contact with and connected to the pair of left and right side surface portions, and the rear wall portion is in contact with and connected to the rear surface portion by bonding or adhesion.

According to the first aspect, the reinforcing member suitable for enhancing the bending rigidity of the at least one of the pair of side frames in the front and rear direction is disposed on the rear side of the lower end side of the at least one of the pair of side frames by being put thereon from the outside. The reinforcing member has an opened cross section and has the pair of left and right side wall portions and the rear wall portion, and the pair of left and right side wall portions and the rear wall portion are connected in a substantially U-shape opened forward. The rear wall portion is thicker than the pair of left and right side wall portions. Further, in a state where the reinforcing member is put on the at least one of the pair of side frames, the pair of left and right side wall portions is in contact with and connected to the pair of left and right side surface portions, and the rear wall portion is in contact with and connected to the rear surface portion by bonding. In this way, in the portion of the at least one of the pair of side frames to which the reinforcing member is attached, the geometrical moment of inertia about an axis extending in the left and right direction increases. In particular, since not only the pair of left and right side wall portions is in contact with and connected to the pair of left and right side surface portions, but also the rear wall portion is in contact with and connected to the rear surface portion by bonding or adhesion, the reinforcing member is integrated with the one side frame to contribute to enhancing the bending rigidity in the front and rear direction. It is noted that bonding includes fusing.

A second aspect of the present disclosure is characterized in that in the first aspect, a thickness of the rear wall portion of the reinforcing member in a front and rear direction gradually increases from an upper side to a lower side.

According to the second aspect, in the portion of the one side frame to which the reinforcing member is attached, the geometrical moment of inertia about an axis extending in the left and right direction gradually increases from the upper side to the lower side. Thus, it is possible to efficiently enhance the bending rigidity according to the magnitude of the bending moment applied to the one side frame.

A third aspect of the present disclosure is characterized in that in the first aspect, the reinforcing member is formed of a fiber-reinforced composite resin material, and a lightweight member lighter than the fiber-reinforced composite resin material is inserted in the rear wall portion.

According to the third aspect, the lightweight member is inserted in the rear wall portion that is thicker than the pair of left and right side wall portions of the reinforcing member. Therefore, the weight of the back frame can be reduced while enhancing the geometrical moment of inertia about an axis extending in the left and right direction by increasing the thickness of the rear wall portion.

A fourth aspect of the present disclosure is characterized in that in the first aspect, the reinforcing member is provided integrally with a lower frame connecting lower end sides of the pair of side frames in a bridging manner.

According to the fourth aspect, since it is possible to enhance the bending rigidity of the one side frame in the front and rear direction by utilizing the lower frame, an increase in the number of parts can be suppressed and the rigidity of the back frame in the left and right direction can be also enhanced.

A fifth aspect of the present disclosure is characterized in that in the first aspect, the closed cross section of the at least one of the pair of side frames has a constant cross section area.

What is claimed is:

1. A back frame of a vehicle seat comprising:
a pair of left and right side frames extending in an upper and lower direction;
an upper frame connecting upper end sides of the pair of side frames in a bridging manner; and
a reinforcing member attached to a rear side of a lower end side of at least one of the pair of side frames by being put thereon from the outside,
wherein the at least one of the pair of side frames has a closed cross section,
wherein on a rear side of the at least one of the pair of side frames, the at least one of the pair of side frames has a pair of left and right side surface portions and a rear surface portion connecting rear end portions of the pair of left and right side surface portions, and the pair of left and right side surface portions and the rear surface portion are connected in a substantially U-shape opened forward, wherein the reinforcing member has an opened cross section and has a pair of left and right side wall portions and a rear wall portion connecting rear end portions of the pair of left and right side wall portions, and the pair of left and right side wall portions and the rear wall portion are connected in a substantially U-shape opened forward, wherein the rear wall portion is thicker than the pair of left and right side wall portions, and wherein the reinforcing member is attached to the at least one of the pair of side frames such that the pair of left and right side wall portions is in contact with and connected to the pair of left and right side surface portions, and the rear wall portion is in contact with and connected to the rear surface portion by bonding or adhesion.

2. The back frame according to claim 1, wherein a thickness of the rear wall portion of the reinforcing member in a front and rear direction gradually increases from an upper side to a lower side.

3. The back frame according to claim 1, wherein the reinforcing member is formed of a fiber-reinforced composite resin material, and a lightweight member lighter than the fiber-reinforced composite resin material is inserted in the rear wall portion.

4. The back frame according to claim 1, wherein the reinforcing member is provided integrally with a lower frame connecting lower end sides of the pair of side frames in a bridging manner.

5. The back frame according to claim 1, wherein the closed cross section of the at least one of the pair of side frames has a constant cross section area.

* * * * *